(12) United States Patent
Hall et al.

(10) Patent No.: US 6,992,554 B2
(45) Date of Patent: Jan. 31, 2006

(54) DATA TRANSMISSION ELEMENT FOR DOWNHOLE DRILLING COMPONENTS

(75) Inventors: David R. Hall, Provo, UT (US); H. Tracy Hall, Jr., Provo, UT (US); David S. Pixton, Lehi, UT (US); Scott Dahlgren, Provo, UT (US); Joe Fox, Spanish Fork, UT (US); Cameron Sneddon, Provo, UT (US); Michael Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 221 days.

(21) Appl. No.: 10/707,234

(22) Filed: Nov. 29, 2003

(65) Prior Publication Data

US 2004/0145492 A1   Jul. 29, 2004

Related U.S. Application Data

(63) Continuation-in-part of application No. 10/604,812, filed on Aug. 19, 2003, which is a continuation of application No. 09/816,766, filed on Mar. 23, 2001, now Pat. No. 6,670,880, which is a continuation-in-part of application No. 09/619,084, filed on Jul. 19, 2000, now abandoned.

(51) Int. Cl.
*H01F 27/02* (2006.01)
(52) U.S. Cl. ...................................................... 336/90
(58) Field of Classification Search .................. 336/83, 336/84 R, 84 M, 84 C, 90, 107, 132; 439/191–194; 285/328, 333, 332.4
See application file for complete search history.

(56) References Cited

U.S. PATENT DOCUMENTS

| 749,633 | A | 1/1904 | Seeley |
|---|---|---|---|
| 2,178,931 | A | 11/1939 | Crites et al. |
| 2,197,392 | A | 4/1940 | Hawthorn |
| 2,249,769 | A | 7/1941 | Leonardon |
| 2,301,783 | A | 11/1942 | Lee |
| 2,354,887 | A | 8/1944 | Silverman et al. |
| 2,379,800 | A | 7/1945 | Hare |
| 2,414,719 | A | 1/1947 | Cloud |
| 2,531,120 | A | 11/1950 | Feaster |
| 2,633,414 | A | 3/1953 | Boivinet |
| 2,659,773 | A | 11/1953 | Barney |
| 2,662,123 | A | 12/1953 | Koenig, Jr. |
| 2,748,358 | A | 5/1956 | Johnston |
| 2,974,303 | A | 3/1961 | Dixon |
| 2,982,360 | A | 5/1961 | Morton et al. |
| 3,079,549 | A | 2/1963 | Martin |
| 3,090,031 | A | 5/1963 | Lord |

(Continued)

*Primary Examiner*—Tuyen T Nguyen
(74) *Attorney, Agent, or Firm*—Jeffery E. Daly (57) ABSTRACT

A robust data transmission element for transmitting information between downhole components, such as sections of drill pipe, in the presence of hostile environmental conditions, such as heat, dirt, rocks, mud, fluids, lubricants, and the like. The data transmission element components include a generally U-shaped annular housing, a generally U-shaped magnetically conductive, electrically insulating element such as ferrite, and an insulated conductor. Features on the magnetically conducting, electrically insulating element and the annular housing create a pocket when assembled. The data transmission element is filled with a polymer to retain the components within the annular housing by filling the pocket with the polymer. The polymer can bond with the annular housing and the insulated conductor but preferably not the magnetically conductive, electrically insulating element. A data transmission element is mounted within a recess proximate a mating surface of a downhole drilling component, such as a section of drill pipe.

23 Claims, 5 Drawing Sheets

U.S. PATENT DOCUMENTS

| | | |
|---|---|---|
| 3,170,137 A | 2/1965 | Brandt |
| 3,186,222 A | 6/1965 | Martin |
| 3,194,886 A | 7/1965 | Mason |
| 3,209,323 A | 9/1965 | Grossman, Jr. |
| 3,227,973 A | 1/1966 | Gray |
| 3,253,245 A | 5/1966 | Brandt |
| 3,518,608 A | 6/1970 | Papadopoulos |
| 3,696,332 A | 10/1972 | Dickson, Jr. et al. |
| 3,793,632 A | 2/1974 | Still |
| 3,807,502 A | 4/1974 | Heilhecker et al. |
| 3,879,097 A | 4/1975 | Oertle |
| 3,930,220 A | 12/1975 | Shawhan |
| 3,957,118 A | 5/1976 | Barry et al. |
| 3,989,330 A | 11/1976 | Cullen et al. |
| 4,012,092 A | 3/1977 | Godbey |
| 4,087,781 A | 5/1978 | Grossi et al. |
| 4,095,865 A | 6/1978 | Denison et al. |
| 4,121,193 A | 10/1978 | Denison |
| 4,126,848 A | 11/1978 | Denison |
| 4,215,426 A | 7/1980 | Klatt |
| 4,220,381 A | 9/1980 | Van der Graaf |
| 4,348,672 A | 9/1982 | Givler |
| 4,445,734 A | 5/1984 | Cunningham |
| 4,496,203 A | 1/1985 | Meadows |
| 4,537,457 A | 8/1985 | Davis, Jr. et al. |
| 4,578,675 A | 3/1986 | MacLeod |
| 4,605,268 A | 8/1986 | Meador |
| 4,660,910 A | 4/1987 | Sharp et al. |
| 4,683,944 A | 8/1987 | Curlett |
| 4,698,631 A | 10/1987 | Kelly, Jr. et al. |
| 4,722,402 A | 2/1988 | Weldon |
| 4,785,247 A | 11/1988 | Meador et al. |
| 4,788,544 A | 11/1988 | Howard |
| 4,806,928 A | 2/1989 | Veneruso |
| 4,884,071 A | 11/1989 | Howard |
| 4,901,069 A | 2/1990 | Veneruso |
| 4,914,433 A | 4/1990 | Galle |
| 4,924,949 A | 5/1990 | Curlett |
| 5,008,664 A | 4/1991 | More et al. |
| 5,052,941 A | 10/1991 | Hernandez-Marti et al. |
| 5,148,408 A | 9/1992 | Matthews |
| 5,248,857 A | 9/1993 | Ollivier |
| 5,278,550 A | 1/1994 | Rhein-Knudsen et al. |
| 5,302,138 A | 4/1994 | Shields |
| 5,311,661 A | 5/1994 | Zifferer |
| 5,332,049 A | 7/1994 | Tew |
| 5,334,801 A | 8/1994 | Mohn |
| 5,371,496 A | 12/1994 | Tanamachi |
| 5,454,605 A | 10/1995 | Mott |
| 5,455,573 A | 10/1995 | Delatorre |
| 5,505,502 A | 4/1996 | Smith et al. |
| 5,517,843 A | 5/1996 | Winship |
| 5,521,592 A | 5/1996 | Veneruso |
| 5,568,448 A | 10/1996 | Tanigushi et al. |
| 5,650,983 A | 7/1997 | Kondo et al. |
| 5,691,712 A | 11/1997 | Meek et al. |
| 5,743,301 A | 4/1998 | Winship |
| RE35,790 E | 5/1998 | Pustanyk et al. |
| 5,810,401 A | 9/1998 | Mosing et al. |
| 5,833,490 A | 11/1998 | Bouldin |
| 5,853,199 A | 12/1998 | Wilson |
| 5,856,710 A | 1/1999 | Baughman et al. |
| 5,898,408 A | 4/1999 | Du |
| 5,908,212 A | 6/1999 | Smith et al. |
| 5,924,499 A | 7/1999 | Birchak et al. |
| 5,942,990 A | 8/1999 | Smith et al. |
| 5,955,966 A | 9/1999 | Jeffryes et al. |
| 5,959,547 A | 9/1999 | Tubel et al. |
| 5,971,072 A | 10/1999 | Huber et al. |
| 6,030,004 A | 2/2000 | Schock et al. |
| 6,041,872 A | 3/2000 | Holcomb |
| 6,045,165 A | 3/2000 | Holcomb |
| 6,046,685 A | 4/2000 | Tubel |
| 6,057,784 A | 5/2000 | Schaaf et al. |
| 6,104,707 A | 8/2000 | Abraham |
| 6,108,268 A | 8/2000 | Moss |
| 6,123,561 A | 9/2000 | Turner et al. |
| 6,141,763 A | 10/2000 | Smith et al. |
| 6,173,334 B1 | 1/2001 | Matsuzaki et al. |
| 6,177,882 B1 | 1/2001 | Ringgenberg et al. |
| 6,188,223 B1 | 2/2001 | Van Steenwyk et al. |
| 6,196,335 B1 | 3/2001 | Rodney |
| 6,209,632 B1 | 4/2001 | Holbert et al. |
| 6,223,826 B1 | 5/2001 | Chau et al. |
| 6,367,565 B1 | 4/2002 | Hall |
| 6,392,317 B1 | 5/2002 | Hall et al. |
| 6,405,795 B2 | 6/2002 | Holbert et al. |
| 6,641,434 B2 | 11/2003 | Boyle et al. |
| 6,655,464 B2 | 12/2003 | Chau et al. |
| 6,670,880 B1 | 12/2003 | Hall et al. |
| 6,830,467 B2 * | 12/2004 | Hall et al. .................. 439/194 |
| 6,844,498 B2 * | 1/2005 | Hall et al. ................ 174/75 C |
| 6,866,306 B2 * | 3/2005 | Boyle et al. ................. 285/333 |
| 6,913,093 B2 * | 7/2005 | Hall et al. ..................... 175/57 |
| 6,929,493 B2 * | 8/2005 | Hall et al. .................. 439/191 |
| 6,945,802 B2 * | 9/2005 | Hall et al. .................. 439/194 |
| 2002/0135179 A1 | 9/2002 | Boyle et al. |
| 2002/0193004 A1 | 12/2002 | Boyle et al. |
| 2003/0070842 A1 | 4/2003 | Bailey et al. |
| 2003/0213598 A1 | 11/2003 | Hughes |

\* cited by examiner

DATA TRANSMISSION ELEMENT FOR DOWNHOLE DRILLING COMPONENTS

CROSS REFERENCE TO RELATED APPLICATIONS

The present application is a continuation-in-part of pending U.S. patent application Ser. No. 10/604,812 filed on Aug. 19, 2003, which is a continuation of U.S. patent application Ser. No. 09/816,766 filed on Mar. 23, 2001 now U.S. Pat. No. 6,670,880. Said application Ser. No. 09/816,766 is a continuation-in-part of U.S. patent application Ser. No. 09/619,084, filed Jul. 19, 2000, now abandoned.

FEDERAL RESEARCH STATEMENT

This invention was made with government support under Contract No. DE-FC26-97FT343656 awarded by the U.S. Department of Energy. The government has certain rights in the invention.

BACKGROUND OF INVENTION

1. Field of the Invention

This invention relates to oil and gas drilling, and more particularly to apparatus for reliably transmitting information between downhole drilling components.

2. Description of the Related Art

For the past several decades, engineers have worked to develop apparatus to effectively transmit information from components located downhole on oil and gas drilling strings to the ground's surface. Part of the difficulty of this problem lies in the development of reliable apparatus for transmitting information from one drill string component to another, such as between sections of drill pipe. The goal is to provide reliable information transmission between downhole components stretching thousands of feet beneath the earth's surface, while withstanding hostile wear and tear of subterranean conditions.

In an effort to provide solutions to this problem, engineers have developed a technology known as mud pulse telemetry. Rather than using electrical connections, mud pulse telemetry transmits information in the form of pressure pulses through fluids circulating through a well bore. However, data rates of mud pulse telemetry are very slow compared to data bandwidths needed to provide real-time data from downhole components.

For example, mud pulse telemetry systems often operate at data rates less than 10 bits per second. At this rate, data resolution is so poor that a driller is unable to make crucial decisions in real time. Since drilling equipment is often rented and very expensive, even slight mistakes incur substantial expense. Part of the expense can be attributed to time-consuming operations that are required to retrieve downhole data or to verify low-resolution data transmitted to the surface by mud pulse telemetry. Often, drilling or other procedures are halted while crucial data is gathered.

In an effort to overcome limitations imposed by mud pulse telemetry systems, reliable connections are needed to transmit information between components in a drill string. For example, since direct electrical connections between drill string components may be impractical and unreliable, converting electrical signals to magnetic fields for later conversion back to electrical signals offers one solution for transmitting information between drill string components.

Moreover, the harsh working environment of drill string components may cause damage to data transmission elements. Furthermore, since many drill string components are located beneath the surface of the ground, replacing or servicing data transmission elements may be costly, impractical, or impossible. Thus, robust and environmentally-hardened data transmission elements are needed to transmit information between drill string components.

SUMMARY OF INVENTION

In view of the foregoing, it is a primary object of the present invention to provide robust transmission elements for transmitting information between downhole components, such as sections of drill pipe, in the presence of hostile environmental conditions, such as heat, dirt, rocks, mud, fluids, lubricants, and the like. It is a further object of the invention to maintain reliable connectivity between transmission elements to provide an uninterrupted flow of information between drill string components.

Consistent with the foregoing objects, and in accordance with the invention as embodied and broadly described herein, an apparatus is disclosed in one embodiment of the present invention as including a data transmission element having a communicating surface mountable proximate a mating surface of a downhole drilling component, such as a section of drill pipe.

By "mating surface," it is meant a surface on a downhole component intended to contact or nearly contact the surface of another downhole component, such as another section of drill pipe. For example, a mating surface can include threaded regions of a box end or pin end of drill pipe, primary or secondary shoulders designed to come into contact with one another, or other surfaces of down-hole components that are intended to contact or come into close proximity to surfaces of other downhole components.

A data transmission element is configured to communicate with a corresponding data transmission element located on another downhole component. The corresponding data transmission element can likewise be mountable proximate a mating surface of the corresponding down-hole component. In order to close gaps present between communicating surfaces of data transmission elements, data transmission elements are biased with respect to the mating surfaces they are mounted on.

By "biased," it is meant, for the purposes of this specification, that a data transmission element is urged, by a biasing member, such as a spring or an elastomeric material, or by a "spring force" caused by contact between a data transmission element and a mating surface, in a direction substantially orthogonal to the mating surface. Thus, the term "biased" is not intended to denote a physical position of a data transmission element with respect to a mating surface, but rather the condition of a data transmission element being urged in a selected direction with respect to the mating surface. In selected embodiments, the data transmission element can be positioned flush with, above, or below the mating surface. The data transmission elements are preferably biased in both the pin ends and box ends though if the data transmission element is biased in only one end of a drilling component and not the other, that is also within the scope of the invention.

In another embodiment of the present invention, a mating surface is shaped to include a recess. A data transmission element is mounted or housed within the recess. In selected embodiments, a recess includes a locking mechanism to retain the data transmission element within the recess. In certain embodiments, the locking mechanism is a locking shoulder shaped into the recess. A data transmission element, once inserted into the recess, slips past and is retained by the locking shoulder.

In another embodiment, a data transmission element on a downhole component communicates with a data transmission element on a separate downhole component by converting an electrical signal to a magnetic field or current. The magnetic field or current induces an electrical current in a corresponding transmission element, thereby recreating the original electrical signal.

In another aspect of the present invention, an apparatus for transmitting data between downhole components includes a loaded generally U-shaped annular housing. By "loaded," it is meant, for the purposes of this specification, providing a "spring force" between a mating surface and an annular housing mounted thereon. The generally U-shaped annular housing is formed such that it is mountable in a recess of a mating surface of a downhole component. The U-shaped annular housing is formed with an inner wall undercut proximate its open end. The U-shaped annular housing may be flush with the mating surface, below the mating surface, above the mating surface, or a combination thereof.

The annular housing preferably includes at least one substantially U-shaped element disposed within the loaded annular housing. The U-shaped element is preferably composed of a magnetically conductive and electrically insulating material, such as ferrite, thereby enabling magnetic current to be retained therein and channeled in a desired direction. The expression "magnetically conductive, electrically insulating," as described within this specification, will be shortened to the acronym MCEI for purposes of brevity. The generally U-shaped MCEI element includes a recess on the outer wall proximate its open end. The open end of the U-shaped MCEI is defined by an inner wall protrusion.

An electrical conductor is disposed within the U-shaped element to carry electrical current. The electrical conductor is electrically insulated to prevent shorting of the conductor to other electrically conductive components. A polymer matrix disposed throughout the open end of the annular housing, MCEI element, and insulated conductor affixes the MCEI element to the annular housing.

BRIEF DESCRIPTION OF DRAWINGS

The foregoing and other features of the present invention will become more fully apparent from the following description, taken in conjunction with the accompanying drawings. The invention will be described with additional specificity and detail through use of the accompanying drawings with the understanding that these drawings depict only typical embodiments in accordance with the invention and are therefore not to be considered limiting in its scope.

DETAILED DESCRIPTION

It will be readily understood that the components of the present invention, as generally described and illustrated in the Figures herein, could be arranged and designed in a wide variety of different configurations. Thus, the following more detailed description of embodiments of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
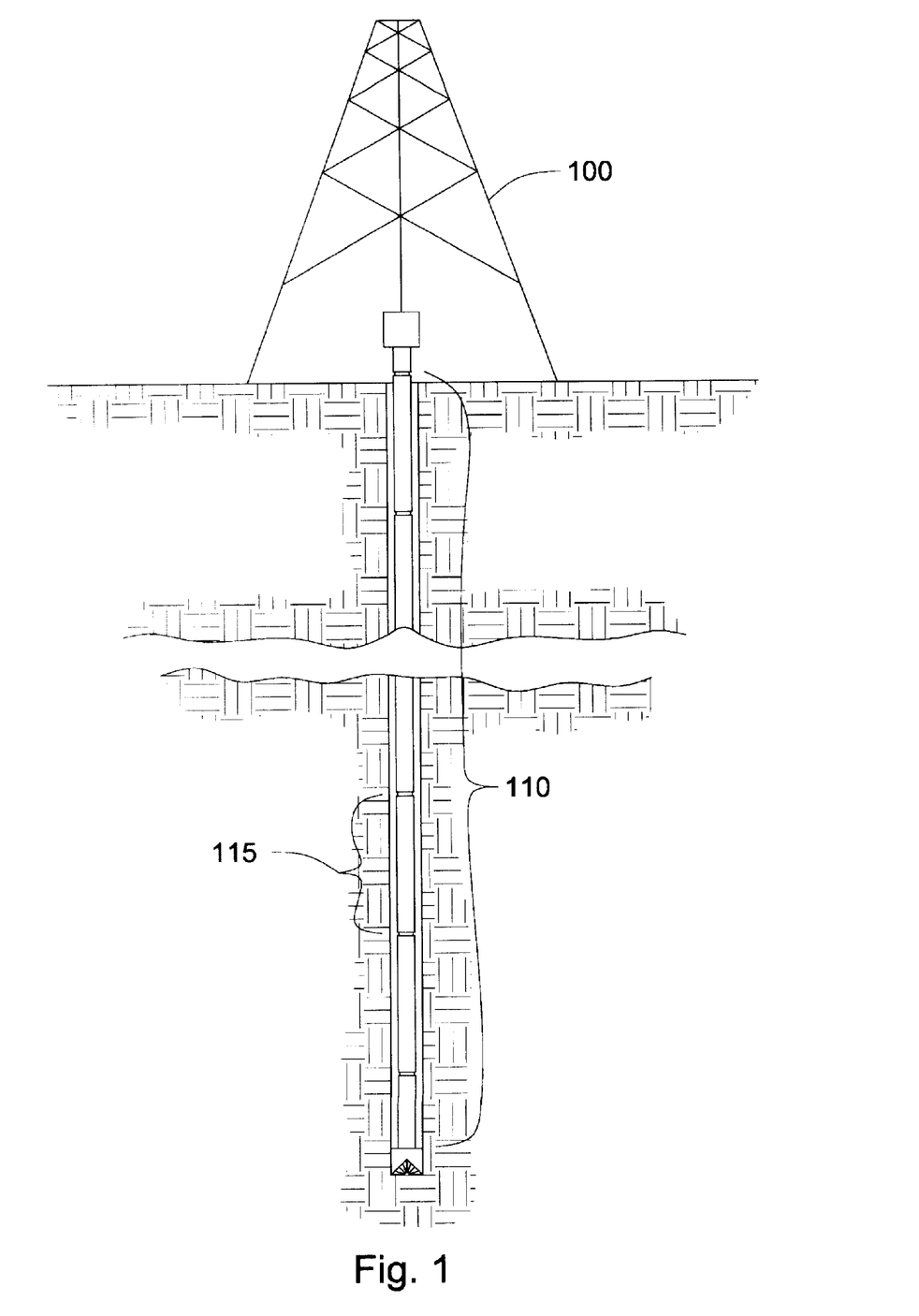
FIG. 1 is a schematic representation of a drill string in a borehole as used on a drilling rig including downhole components.

Referring to the drawings, FIG. 1 is a schematic representation of a drill string 110 in a borehole as used on a drilling rig 100 including drilling components 115. Some examples of drilling components are drill collars, jars, heavy weight drill pipe, drill bits, and of course drill pipe.

Figure 2:
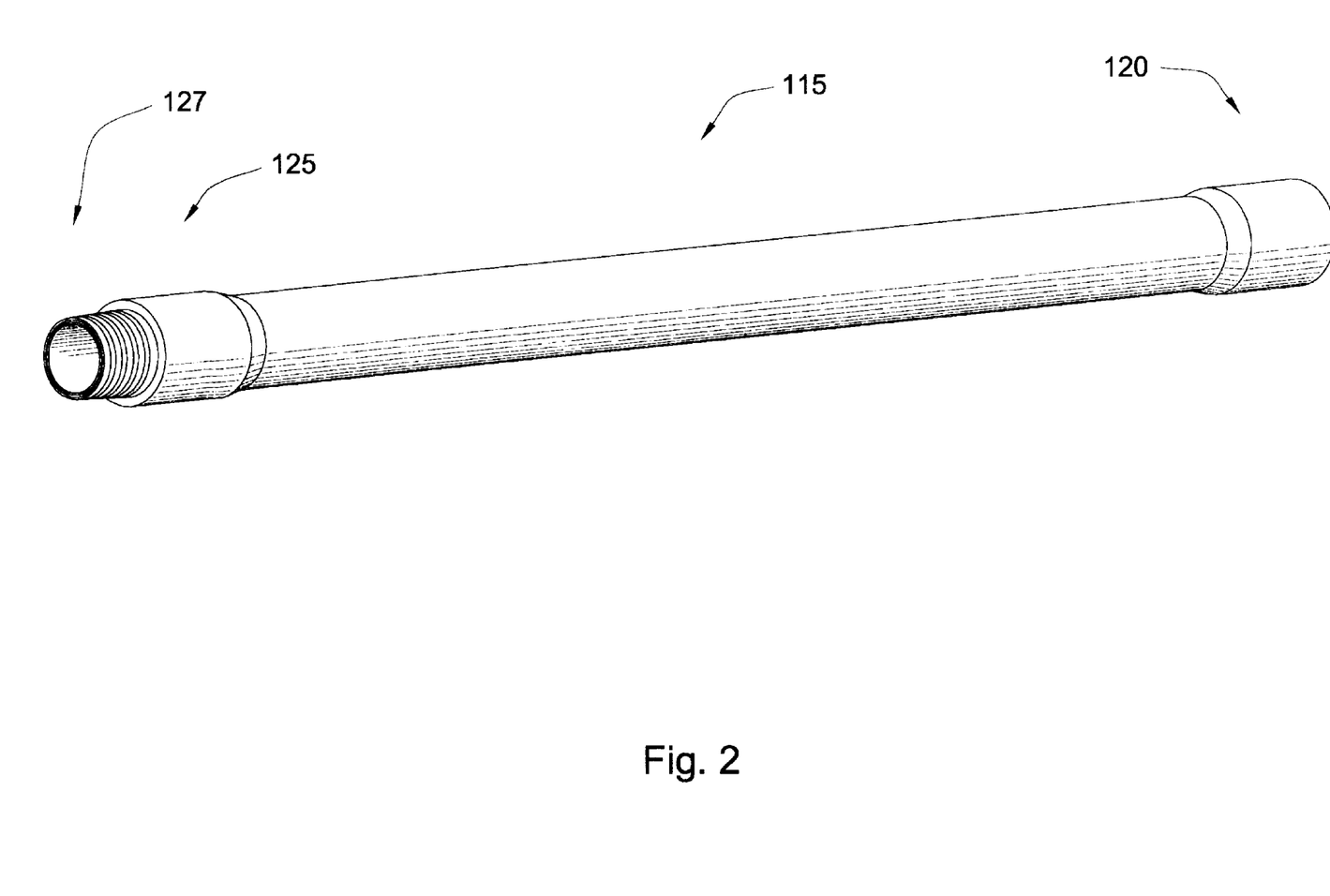
FIG. 2 is a drill pipe, a typical example of a downhole component including tool joint sections using transmission elements, in accordance with the invention, to transmit and receive information along a drill string.

FIG. 2 shows one example of a drilling component, a drill pipe 115 including a box end tool joint 120, and pin end tool joint 125. Tool joints are attached to the component and provide threads or other devices for attaching the tools together, and to allow a high torque to be applied to resist the forces present when making up a drill string or during drilling. Between the pin end 125 and box end 120 is the body of the drill pipe section. A typical length of the body is between 10 and 90 feet. Drill strings in oil and gas production can extend as long as 20,000 feet, which means that as many as 700 sections of drill pipe and downhole components can be used in the drill string.

Figure 3:
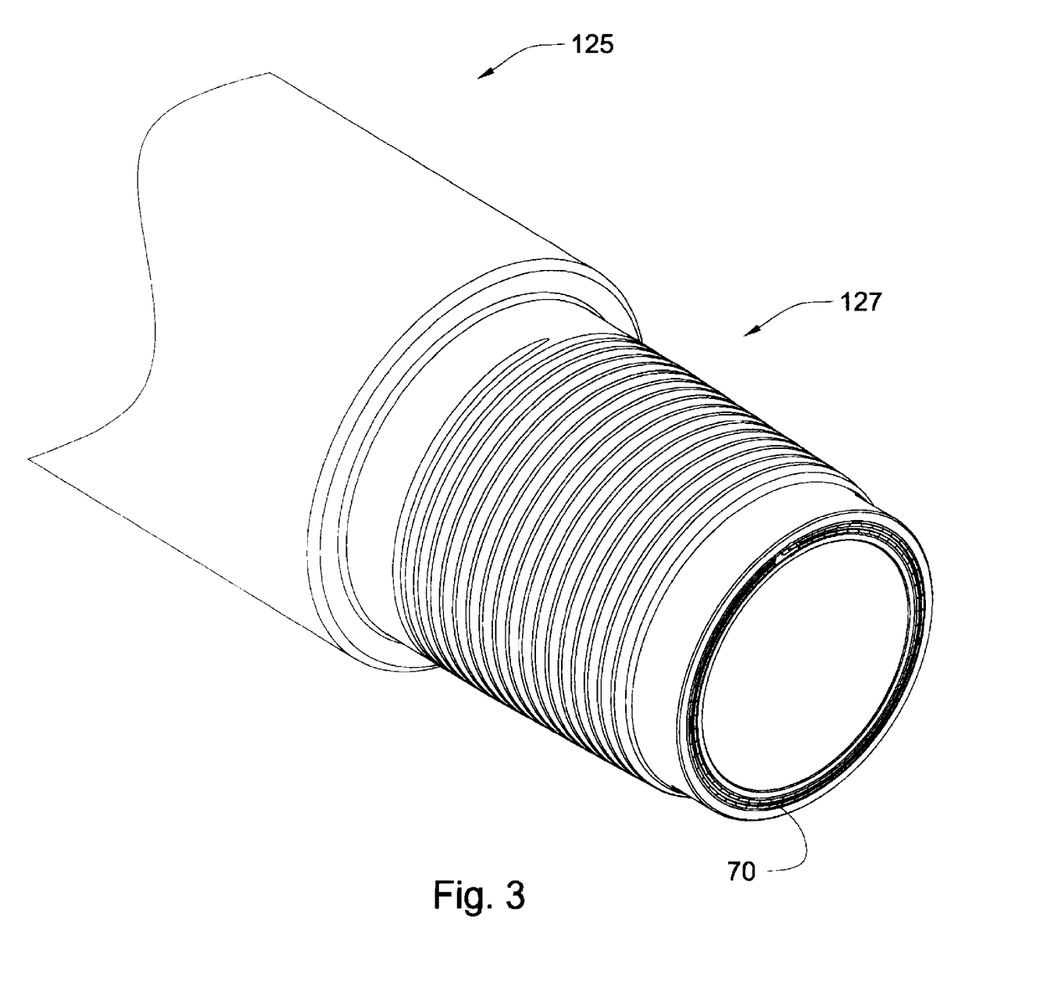
FIG. 3 is a close up view of the pin nose of the pin end tool joint of FIG. 2 illustrating the data transmission element retained within the pin end tool joint.

A close up of pin end tool joint 125 is shown in FIG. 3. A coaxial cable is disposed within the drill pipe running along the longitudinal axis of the drill pipe 115. The coaxial cable includes a conductive tube and a conductive core within it (not shown). A data transmission element 70 is disposed in the pin nose 127 of pipe 115. A close up (not shown) of the box end 120 of pipe 115 would depict a similar placement of the data transmission element.

In a preferred embodiment the drill pipe will include tool joints as depicted in FIG. 2 however, a drill pipe without a tool joint can also be modified to house the coaxial cable and data transmission element; thus tool joints are not necessary for the invention. The coaxial cable and data transmission element could be disposed in other down-hole components such drill collars, jars, and similar components that would be typically found in a drill string. Additionally the coaxial cable could be disposed within other downhole components used in oil and gas or geothermal exploration through which it would be advantageous to transmit an electrical signal and thus necessitate a data transmission element.

The conductive tube is preferably made of metal, more preferably a strong metal, most preferably steel. By "strong metal" it is meant that the metal is relatively resistant to deformation in its normal use state. The metal is preferably stainless steel, most preferably 316 or 316L stainless steel. A preferred supplier of stainless steel is Plymouth Tube, Salisbury, Md.

In an alternative embodiment, the conductive tube may be insulated from the pipe in order to prevent possible galvanic corrosion. At present, the preferred material with which to insulate the conductive tube is PEEK®.

The data transmission element 70 converts an electrical signal to a magnetic field or magnetic current. A corresponding transmission element (not shown) in the box end 120 located proximate the transmission element 70 when the box end and pin end are torqued together, detects the magnetic field or current. The magnetic field induces an electrical current into the box end data transmission element that is transmitted to the coaxial cable located along the drill pipe 115 or downhole component.

Figure 4:
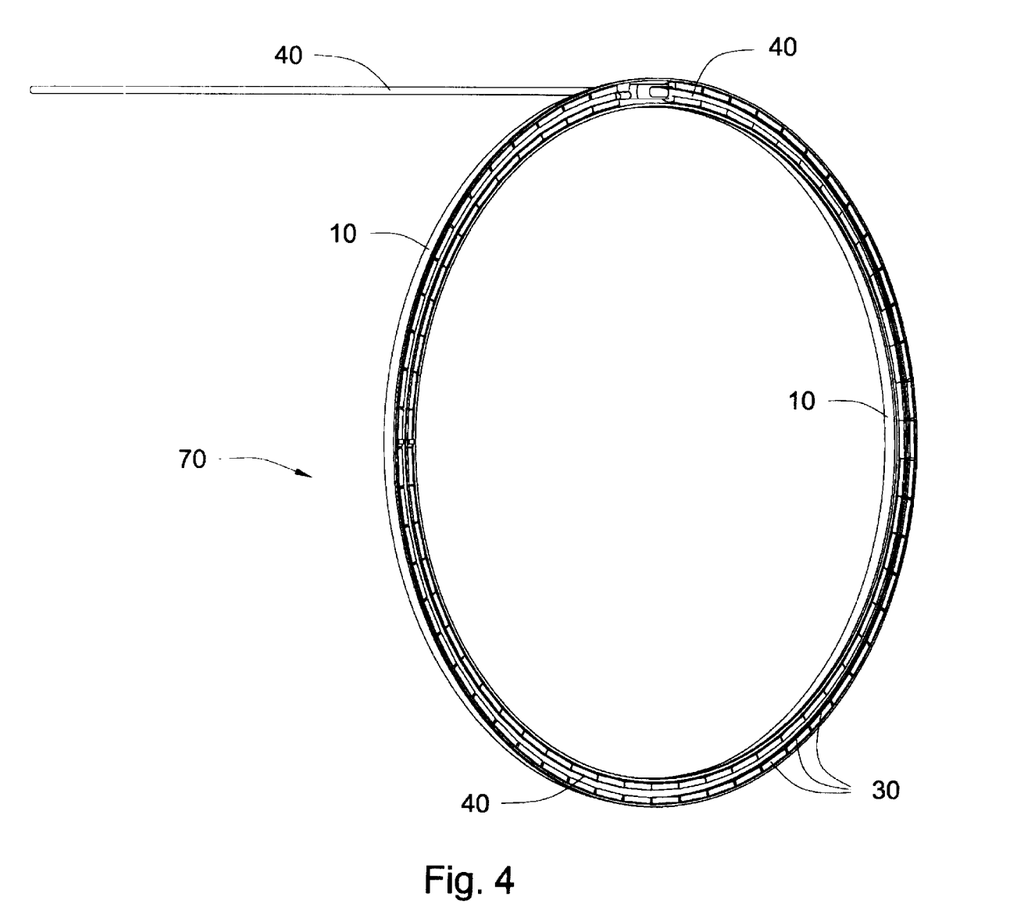
FIG. 4 is a perspective view illustrating the data transmission element free standing.

Referring to FIG. 4, a data transmission element 70 includes a generally U-shaped annular housing 10. The annular housing 10 includes a magnetically conducting, electrically insulating or MCEI element 30 therein, such as ferrite or some other material of similar electrical and magnetic properties. As is shown in FIG. 4, the MCEI element can be segmented for durability purposes while in use during downhole operation, though a single annular U-shaped MCEI element (not shown) that can be placed within the annular housing 10 is within the scope of the invention. Since materials such as ferrite may be quite brittle, the U-shaped elements 30 are preferably provided in segments to prevent cracking or breakage that might otherwise occur using a single piece of ferrite. An insulated conductor 40 is located within the MCEI segmented elements 30. The MCEI element 30 is formed in a U-shape and fit within the housing 10.

The annular housing 10 is preferably constructed of a hard material that is electrically conductive such as certain metals. The metals could be steel, titanium, chrome, nickel, aluminum, iron, copper, tin, and lead. The various types of steel employed could be viscount 44, D2, stainless steel, tool steel, and 4100 series steels. Stainless steel such as 17-4 however is the most preferable material out of which to construct the U-shaped annular housing. Stainless steel provides for ample corrosion resistance thus increasing the life of the data transmission element while in a highly corrosive envrionment such as downhole drilling.

As current flows through the insulated conductor 40, a magnetic flux or field is created around the insulated conductor 40. The U-shaped MCEI element 30 serve to contain the magnetic flux created by the conductor 40 and prevent energy leakage into surrounding materials. The U-shape of the element 32 also serves to transfer magnetic current to a similarly shaped element 32 in another data transmission element.

Figure 5:
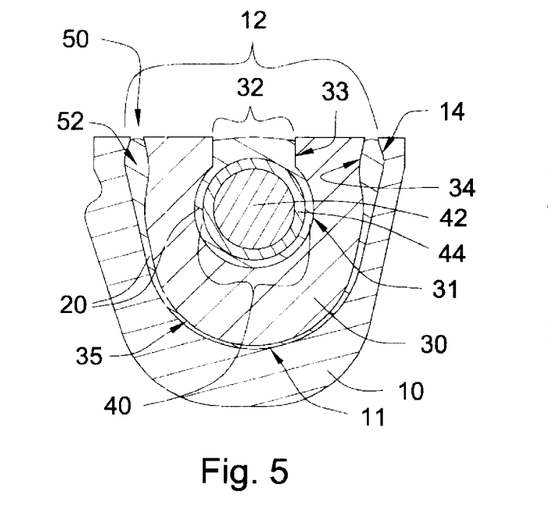
FIG. 5 is a cross-sectional side view of the data transmission element illustrating the placement of the MCEI element, insulated conductor, and polymer matrix, within the U-shaped annular housing.
Figure 6:
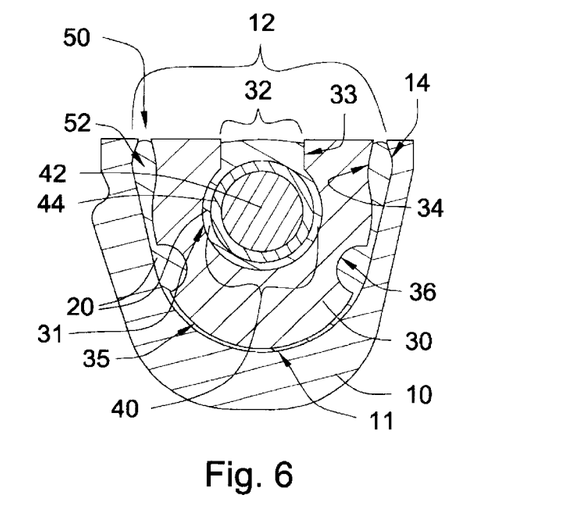
FIG. 6 is another embodiment of the present invention depicting the plurality of recesses formed on the MCEI outer side wall.
Figure 7:
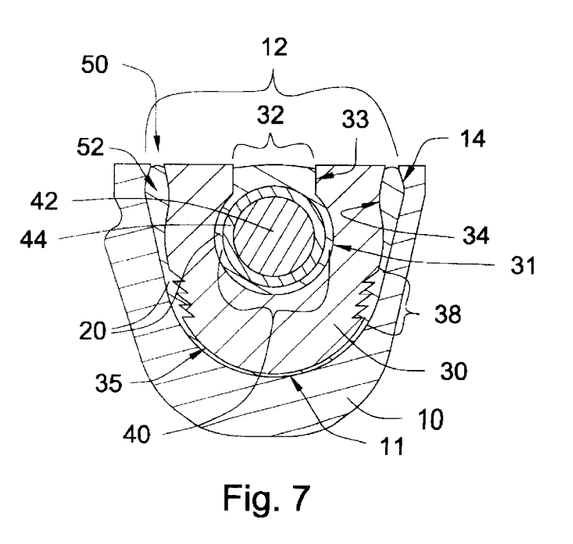
FIG. 7 is another embodiment of the present invention depicting the plurality of recesses forming barbs.

Turning now to FIGS. 5–7, we will discuss the particular aspects of the present invention and their various embodiments. FIG. 5 is a cross section of the most preferred embodiment of the data transmission element 70 as shown in FIG. 4. A generally U-shaped annular housing 10 forms the "backbone" of the data transmission element. An inner wall 11 is formed with an undercut 14 proximate the annular housing open end 12. A generally U-shaped MCEI element 30 is disposed within the annular housing 10. The U-shaped MCEI element includes an inner wall 31, an open end 32, and an outer wall 35. An outer wall recess 34 is formed proximate the open end 32. An inner wall protrusion 33 defines the open end 32 of the MCEI element 30.

A gap 50 is formed between the inner wall 11 of the annular housing 10 and the outer wall 35 of the MCEI element 30. The outer wall recess 34 is generally opposite the undercut 14, thus forming a pocket 52 between the MCEI element 30 and the annular housing 10. The formed pocket 52 needs to be wider than the gap 50 for reasons that will be discussed below.

Within the U-shaped MCEI element 30, an insulated conductor 40 is provided to carry electrical current therethrough. The conductor 42 of the insulated conductor 40 is coated with an electrically insulating material 44.

The inner wall protrusion 33 serves to retain the insulated conductor 40 within the MCEI element 30. Preferably the diameter of the insulated conductor 40 is larger than the open end 32 of the MCEI element 30.

The most preferable type of conductor material is a nickel or silver plated copper clad stainless steel wire. The stainless steel core imparts strength to the insulated conductor and corrosion resistance. Copper is necessary for good conductivity and nickel or silver for the ability to bond with polymers which form the insulating material. Other possible materials for the conductor are copper, copper clad steel, copper clad stainless steel, silver plated copperclad steel, and nickel plated copper clad steel. A preferred supplier of copperclad steel and stainless steel wires is Copperweld, Fayetteville, Tenn. A preferred silver of nickel plater is Phelps Dodge Wire and Cable, Inman, S.C.

The gap 50, pocket 52, and MCEI element 30 are filled with a polymer 20 such that the polymer affixes the MCEI element 30 within the generally U-shaped annular housing 10 and the insulated conductor 40 within the generally U-shaped MCEI element 30. The polymer forms a bulbous region the width thereof matching the pocket width. The polymer bulbous region is therefore wider than the gap 50 and cannot move past the gap 50 and therefore keys the MCEI element in place simliar to a cotter. Thus the MCEI element 30 cannot be removed from the annular housing 10, except by destroying the MCEI element and thus the data transmission element, in the process of extraction. Filling the space between the insulating conductor 40 and the MCEI element 30 with a polymer further enhances the retention of the conductor within the MCEI element. Furthermore, the polymer forms a key on top of the insulating conductor thereby not allowing any twisting of the insulated conductor within the MCEI element.

It is desirable for the polymer to bond to the annular housing and the insulated conductor but not the MCEI element. When a drilling component goes deeper into a borehole, the surroundings become natually hotter, thus thermal expansion of materials within the data transmission element becomes problematic, particuarly if some of the components are fragile. The MCEI element, which is preferably constructed of ferrite, is just such a fragile component. If the polymer bonded to the MCEI element, then upon expansion of the polymer, annular housing, and insulated conductor, the MCEI could fissure, and catastrophically break. If an MCEI element such as ferrite breaks, it loses its inherent ability to be magnetically conductive, thus decreasing overall efficiency of the data transmission element and in some cases if enough damage is done, rendering it ineffectual. Because the polymer doesn't bond to the MCEI element, when the annular housing, polymer, and insulated conductor thermally expand, the MCEI element remains stable, intact, and in place.

This same feature is also beneficial for the spring loaded data transmission element as discussed above. By stretching the annular housing as it is forced into the recess within the mating surface of a downhole component, the pliant characteristic of the polymer allows it to stretch along with the annular housing, but without pulling apart the MCEI element.

Various types of polymers can be employed as the "filler material" for the data transmission element such as polyether ether ketone or PEEK and polyether ketone ketone or PEKK. A thermoplastic material is desirable for its processability characteristics as well as a fluoropolymer type material for its unreactivity to many chemicals. Teflon® is one such type of thermoplastic fluoropolymer. Various grades of Teflon® are available such as perfluoroalkoxy copolymer or PFA, fluorinated ethylene propylene or FEP, ethylene-tetrafluoroethylene or ETFE, amorphous fluoropolymer or AF, polytetrafluoroethylene or PTFE, and ethylene-chlorotrifluoroethylene copolymer or ECTFE. ECTFE is also known as Halar. These materials also have desirable mechanical and electrical properties excellent for use within the data transmission element. Teflon® is well known as a dielectric which is often used in the production of coaxial cables.

These same materials can form the electrically insulating material that is bonded to the conductor of the insulated conductor housed within the MCEI element. The most preferable insulating material and polymer filler is PFA and FEP respectively. The respective melting point of PFA and FEP, with PFA higher than FEP, allows for feasable processability of the data transmission element. The PFA is bonded or coated onto the conductor, forming the insulated conductor, prior to assembly of the data transmission element. When the annular housing, insulated conductor, and MCEI elements are assembled and filled with FEP, the temperature necessary for the processing of the FEP will not spoil the integrity of the PFA on the conductor, thus ensuring proper insulation. This principle can be used with other thermoplastics besides just PFA and FEP as long as the insulating material melting temperature is sufficiently higher than the filler polymer melting temperature.

Referring to FIG. 6, the MCEI element 30 can also contain a plurality of outer wall recesses 36. By including more than one outer wall recess, the mechanical retention of the MCEI element 30 within the annular housing 10 is strengthened. The other features of the data transmission element as previously described are also shown in FIGS. 6 and 7. Another embodiment of the MCEI element 30 is shown in FIG. 7. The MCEI element 30 includes barbs 38 that are formed in the plurality of recesses. This feature makes it especially difficult to forcibly extract the MCEI element or for it to delaminate from the annular housing 10.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Whereas the present invention has been described in particular relation to the drawings attached hereto, it should be understood that other and further modifications apart from those shown or suggested herein, may be made within the scope and spirit of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. A data transmission element for downhole components, comprising:
   a generally U-shaped annular housing having an inner wall undercut proximate its open end;
   a generally U-shaped MCEI element comprising an inner wall, an outer wall; and an open end, an outer wall recess proximate the open end and an inner wall protrusion defining the open end;
   the MCEI element being disposed within the annular housing such that the inner wall of the annular housing and the outer wall of the MCEI element form a gap and the recess is generally opposite the undercut forming a pocket wider than the gap there between;
   an insulated conductor being disposed within the MCEI element;
   wherein the gap, the pocket, and the MCEI element are filled with a polymer such that the polymer affixes the MCEI element within the generally U-shaped annular housing and the insulated conductor within the MCEI element.

2. The data transmission element of claim 1, wherein the polymer is a thermoplastic material.

3. The data transmission element of claim 2, wherein the thermoplastic material is a fluoropolymer.

4. The data transmission element of claim 3, wherein the fluropolymer is Teflon®.

5. The data transmission element of claim 4 wherein the Teflon® material is chosen from the group consisting of PFA, FEP, ETFE, AF, PTFE, and ECTFE.

6. The data transmission element of claim 1 wherein the polymer bonds to the annular housing.

7. The data transmission element of claim 1, wherein the polymer bonds to the insulated conductor.

8. The data transmission element of claim 1, wherein the polymer does not bond to the MCEI element.

9. The data transmission element of claim 1 wherein the insulated conductor has a diameter that is larger than the open end of the MCEI element.

10. The data transmission element of claim 1 wherein the conductor material of the insulated conductor is selected from the group consisting of copper, copper clad steel, silver plated copper clad steel, nickel plated copper clad steel, copper clad stainless steel, silver plated copper clad stainless steel, and nickel plated copper clad stainless steel.

11. The data transmission element of claim 1 wherein the insulating material of the insulated conductor is bonded to the conductor.

12. The data transmission element of claim 1 wherein the insulating material of the insulated conductor is a polymer.

13. The data transmission element of claim 12 wherein the polymer is a thermoplastic material.

14. The data transmission element of claim 13, wherein the thermoplastic material is a fluoropolymer.

15. The data transmission element of claim 14 wherein the fluoropolymer material is Teflon®.

16. The data transmission element of claim 15 wherein the Teflon® is chosen from the group consisting of PFA, FEP, ETFE, AF, PTFE, and ECTFE.

17. The data transmission element of claim 1 wherein the MCEI element is segmented.

18. The data transmission element of claim 1 wherein the MCEI element has a plurality of outer wall recesses.

19. The data transmission element of claim 18 wherein the plurality of outer wall recesses form barbs.

20. The data transmission element of claim 1 wherein the MCEI element is constructed of ferrite.

21. The data transmission element of claim 1 wherein the generally U-shaped annular housing is made of metal.

22. The data transmission element of claim 21 wherein the metal is selected from the group consisting of steel, titanium, chrome, nickel, aluminum, iron, copper, tin, and lead.

23. The data transmission element of claim 22 wherein the steel is selected from the group consisting of viscount 44, D2, stainless steel, tool steel, and 4100 series steels.

* * * * *